United States Patent
Sokolofsky (10) Patent No.: US 7,517,278 B2
(45) Date of Patent: Apr. 14, 2009

(54) MODE MECHANIZATION SYSTEM WITH INTEGRATED HEATER OUTLET

(75) Inventor: Phillip M. Sokolofsky, Akron, NY (US)

(73) Assignee: Delphi Technologies, Inc., Troy, MI (US)

( * ) Notice: Subject to any disclaimer, the term of this patent is extended or adjusted under 35 U.S.C. 154(b) by 227 days.

(21) Appl. No.: 11/708,482

(22) Filed: Feb. 20, 2007

(65) Prior Publication Data

US 2008/0000537 A1 Jan. 3, 2008

Related U.S. Application Data

(60) Provisional application No. 60/817,659, filed on Jun. 29, 2006.

(51) Int. Cl.
*B60H 1/00* (2006.01)
*B60H 1/34* (2006.01)
*F24F 3/052* (2006.01)
*F16H 1/20* (2006.01)

(52) U.S. Cl. .................. 454/152; 454/69; 454/121; 454/156; 165/204; 137/865

(58) Field of Classification Search ............. 454/69, 454/121, 126, 152, 156; 165/204; 137/865
See application file for complete search history.

(56) References Cited

U.S. PATENT DOCUMENTS 1,738,526 A * 12/1929 Diebel ................... 454/19
2,104,279 A * 1/1938 Sperry .................... 454/155
2,578,945 A * 12/1951 Rigby ..................... 165/9
2,622,850 A * 12/1952 Tipler ..................... 165/7
6,032,723 A * 3/2000 Tsuihiji et al. ............. 165/42
6,209,404 B1 * 4/2001 Le ......................... 74/89.18
6,431,266 B1 * 8/2002 Han ........................ 165/204
2005/0107027 A1 * 5/2005 Kachi ..................... 454/156

FOREIGN PATENT DOCUMENTS

DE     10135330 A1 * 2/2003
EP       600779 A1 * 6/1994
EP       904964 A2 * 3/1999
JP      01070214 A  * 3/1989

OTHER PUBLICATIONS

European Search Report dated Oct. 4, 2007.

* cited by examiner

*Primary Examiner*—Steven B McAllister
*Assistant Examiner*—Patrick F. O'Reilly, III
(74) *Attorney, Agent, or Firm*—Patrick M. Griff (57) ABSTRACT

An HVAC controller housing including a plurality of valves extending therein for directing airflow to a plurality of ducts is provided. The housing is of the type including a side port extending outwardly from the housing and in fluid communication with one of the ducts. A drive gear is provided on the housing to drive a plurality of driven gears disposed on the housing for driving the plurality of valves. The driven gears are responsive to the drive gear through a transmission member comprising an annular idling gear in meshing engagement with the drive gears and at least one of the driven gears. The annular idling gear is rotatably supported on the housing and encircles the side port for efficient torque transfer between the drive gear and the driven gears.

23 Claims, 6 Drawing Sheets

MODE MECHANIZATION SYSTEM WITH INTEGRATED HEATER OUTLET

CROSS REFERENCE TO RELATED APPLICATION

This application claims the benefit of application Ser. No. 60/817,659 filed on Jun. 29, 2006.

BACKGROUND OF THE INVENTION

1. Field of the Invention

The subject invention relates to an assembly for controlling airflow in an HVAC system in different modes of operation.

2. Description of the Prior Art

HVAC systems typically include a variety of ducts for conducting air based on a selected mode of operation. For example, a vehicle HVAC system might include heater ducts, defrost ducts, and rear mode ducts. A housing is provided to house a plurality of valves for directing airflow through these ducts. The housing defines a side port outlet in fluid communication with one of the ducts. A plurality of driven gears are connected to a plurality of valve levers. The levers connect the valves to one of the driven gears for actuating the valves in response to rotation of the driven gears. Torque for rotating the driven gears is provided by an actuator (not shown) rotating a drive gear. A transmission member is provided to link the drive gear to the driven gears while circumventing the side port. The known transmission member comprises a series of levers extending between the gears. These levers provide inefficient torque transmission from the actuator.

SUMMARY OF THE INVENTION AND ADVANTAGES

The subject invention provides such a heat exchanger wherein the transmission member includes an annular idling gear rotatably supported on the housing for rotation about an annular gear axis and encircling the side port and engaging the drive gear and engaging the driven gear.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
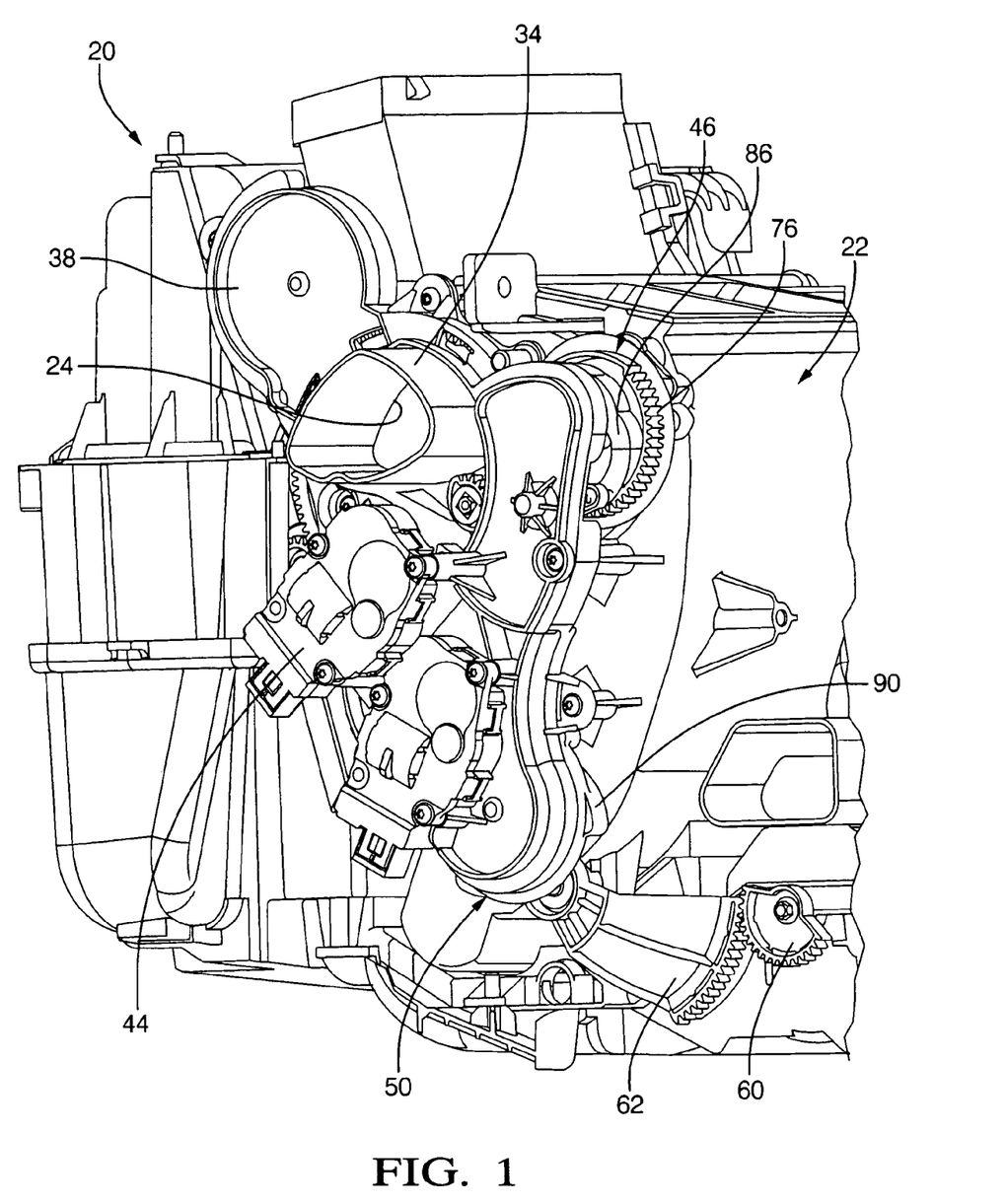
FIG. 1 is a perspective view of an HVAC control housing in accordance with an exemplary embodiment of the present invention.
Figure 2:
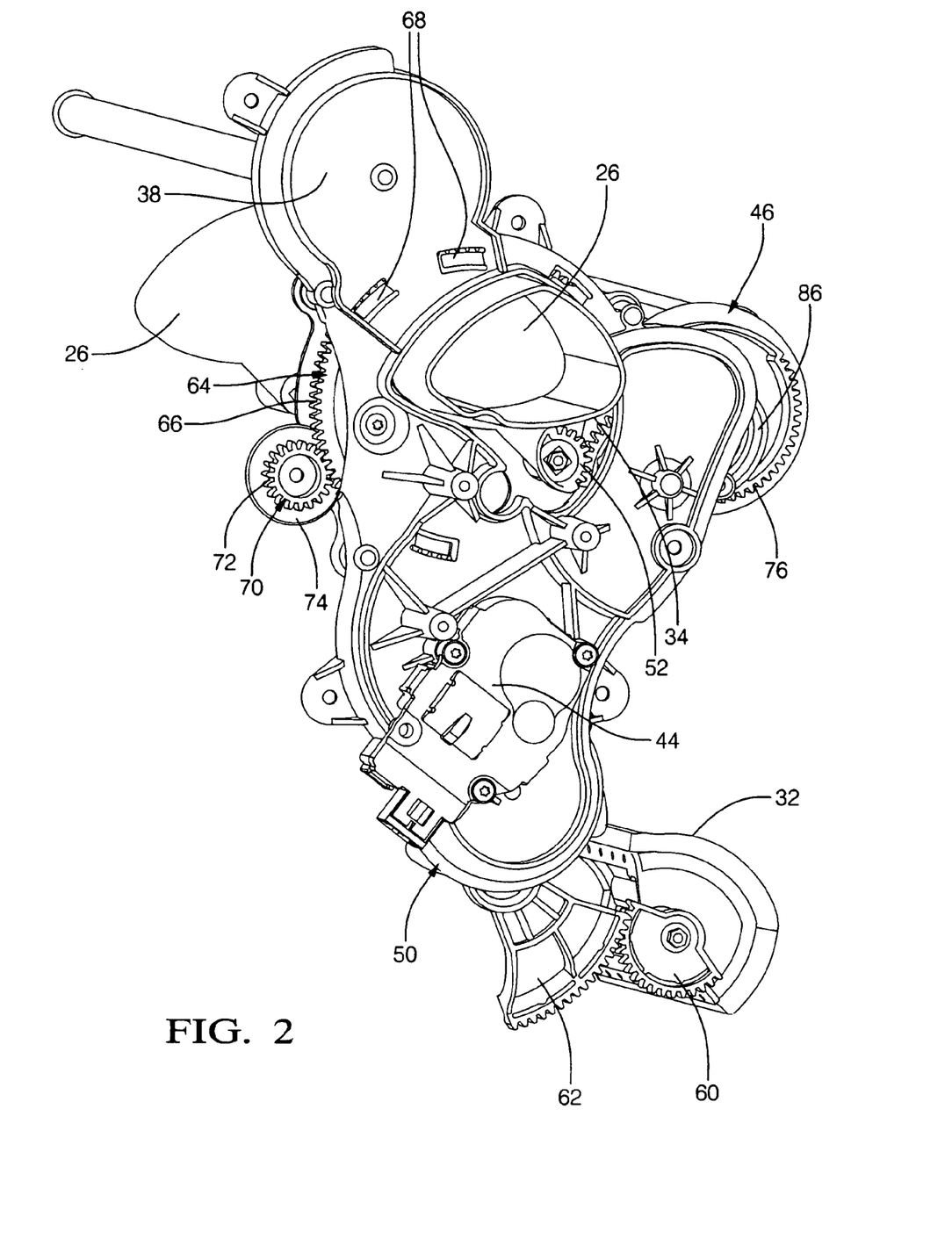
FIG. 2 is a perspective view of a subassembly for actuating the valves of the housing in accordance with the exemplary embodiment.
Figure 3:
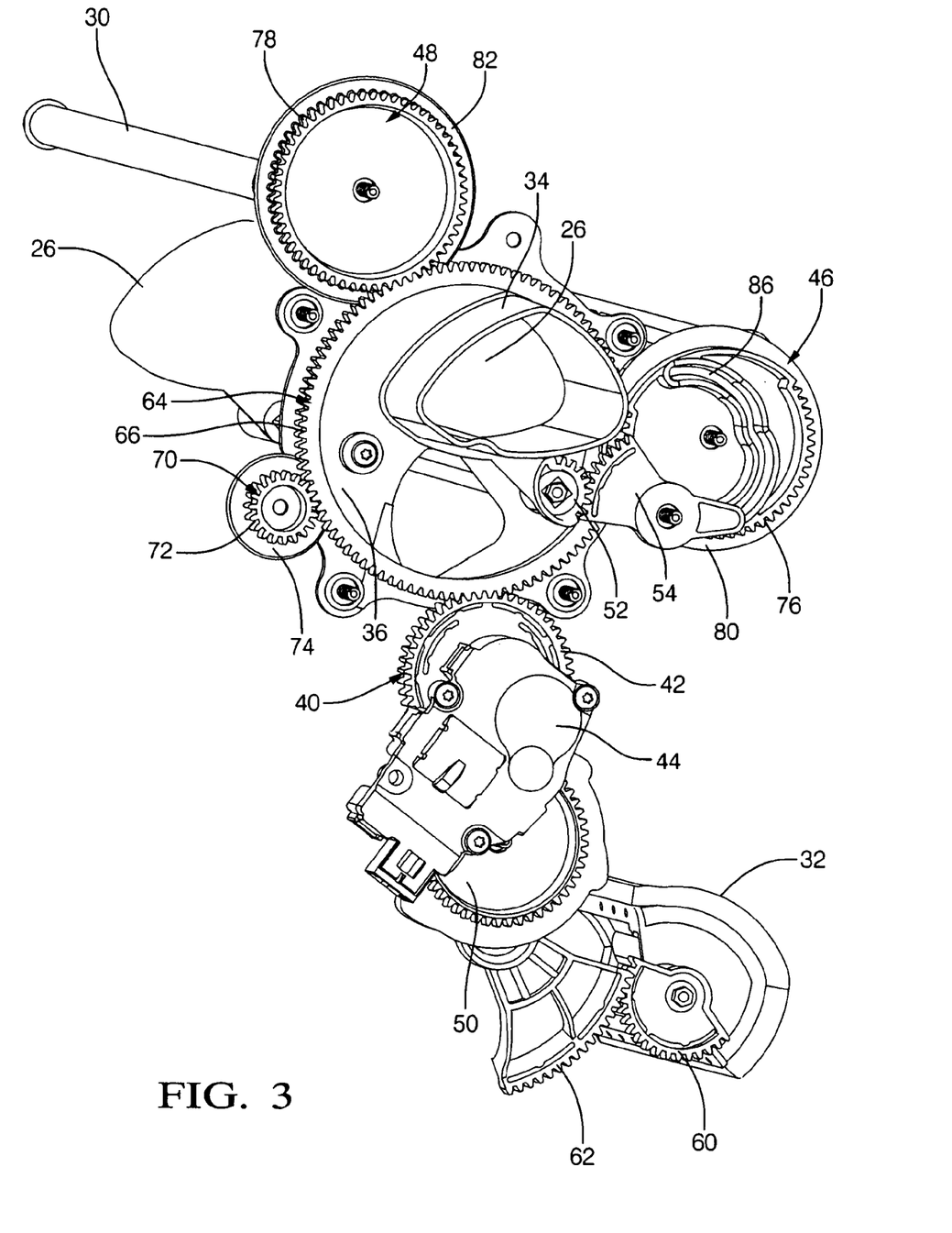
FIG. 3 is a perspective view of the subassembly of FIG. 2 with the upper mounting bracket removed.
Figure 4:
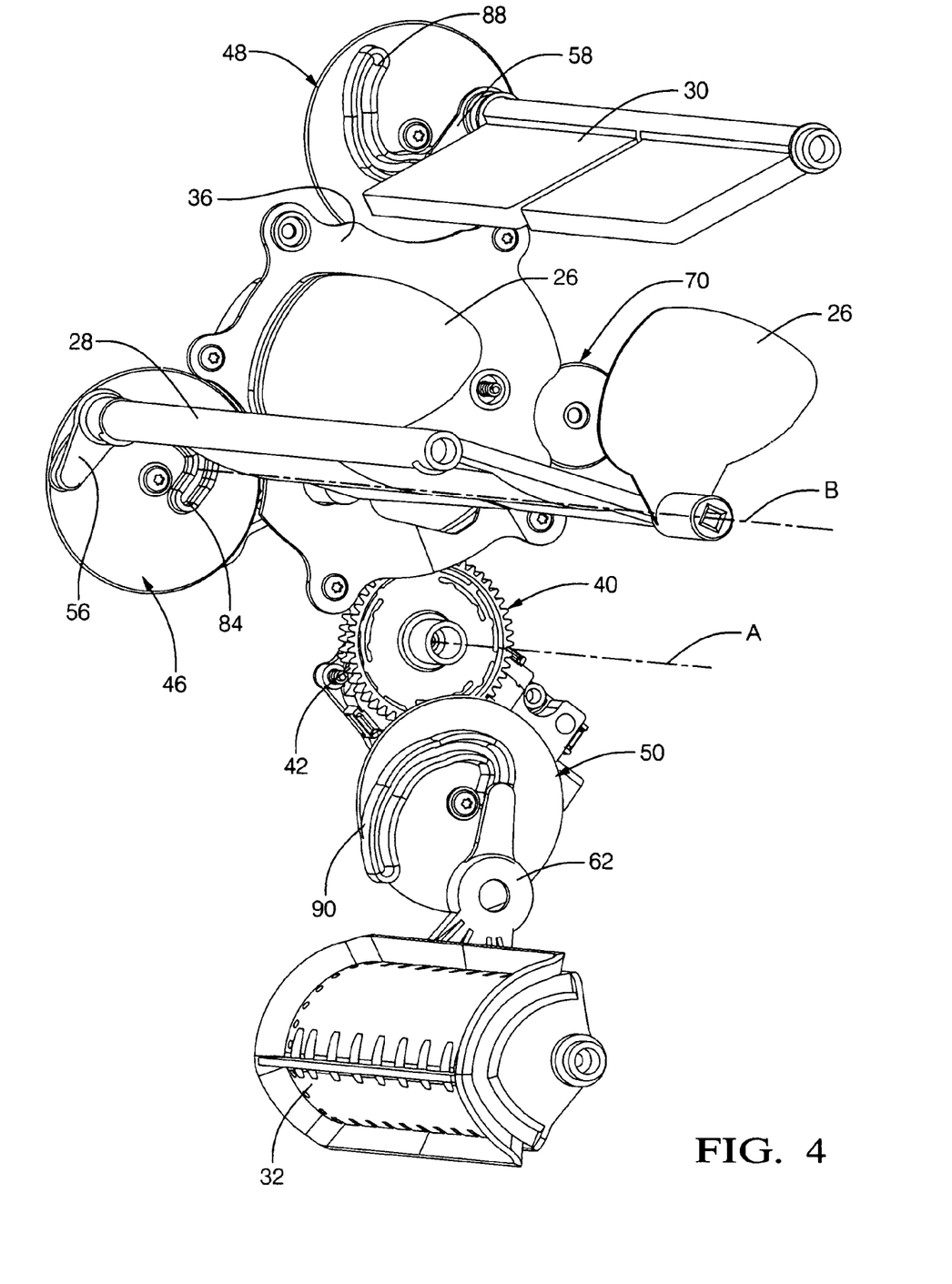
FIG. 4 is an alternate perspective view of the subassembly of FIG. 2 from a rear elevation.
Figure 5:
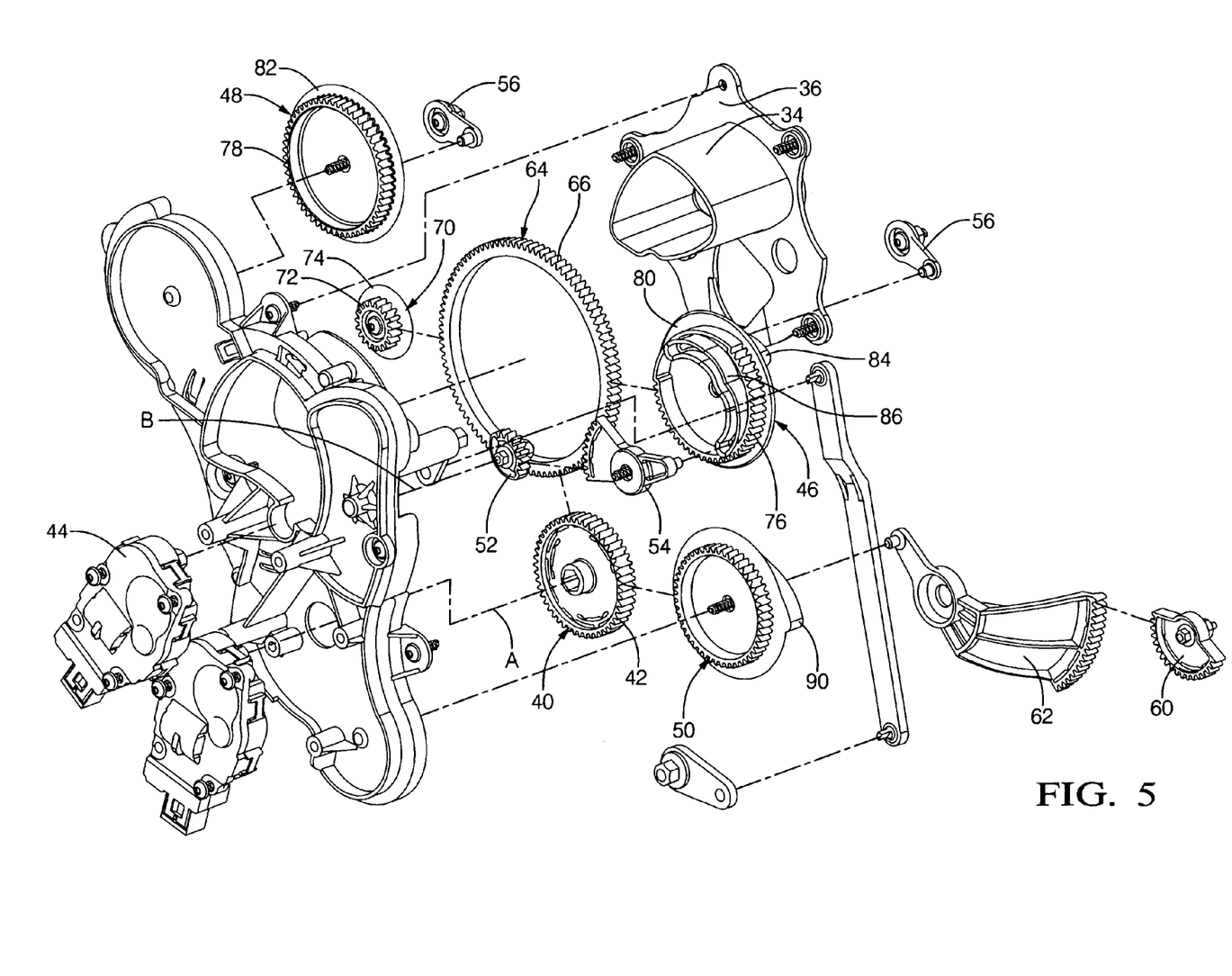
FIG. 5 is an exploded perspective view of the subassembly of FIG. 2.

Referring to the Figures, wherein like numerals indicate corresponding parts throughout the several views, an assembly 20 is generally shown for controlling airflow in an HVAC system in different modes of operation. Referring first to FIG. 1, the assembly 20 includes a housing 22 for directing airflow through a plurality of ducts within the housing 22. A housing outlet 24 having an outer periphery is defined on the housing 22 and is connected fluidly to one of the plurality of ducts. According to the exemplary embodiment, the housing outlet 24 is connected to a heater duct. Referring next to FIGS. 2-5, a plurality of valves 26, 28, 30, 32 extend within the housing 22. Although the exemplary embodiment shows four valves 26, 28, 30, 32, the use of the term plurality throughout the application should be understood to mean two or more. The valves 26, 28, 30, 32 are rotatably supported within the housing 22 and direct airflow through at least one of the plurality of ducts in response to a selected mode of operation.

A side port 34 extends outwardly from the housing 22 and is in fluid communication with the housing outlet 24. The housing 22 includes a lower mounting bracket 36 extending laterally outwardly from the side port 34, and is formed integrally with the side port 34. The housing 22 also includes an upper mounting bracket 38 having an opening therein for receiving the side port 34.

A gear system is provided to actuate the plurality of valves 26, 28, 30, 32, including a drive gear 40 rotatably supported on the upper mounting bracket 38 for rotation about a drive axis A. The drive gear 40 includes a plurality of drive gear teeth 42 disposed thereabout. An actuator 44 is secured to the upper mounting bracket 38 for rotating the drive gear 40 about the drive axis A. A plurality of driven gears 46, 48, 50 are also provided. According to the exemplary embodiment, the plurality of driven gears 46, 48, 50 includes a vent driven gear 46, a defrost driven gear 48, and a rear mode driven gear 50. Each driven gear is rotatably supported on the upper mounting bracket 38, and is connected to the plurality of valves 26, 28, 30, 32 through a plurality of valve levers 52, 54, 56, 58, 60, 62. Each valve lever connects one of the valves 26, 28, 30, 32 to one of the driven gears 46, 48, 50 for actuating the valves 26, 28, 30, 32 in response to rotation of the driven gears 46, 48, 50. The respective valve lever systems for each driven gear will be discussed in more detail later.

Figure 6:
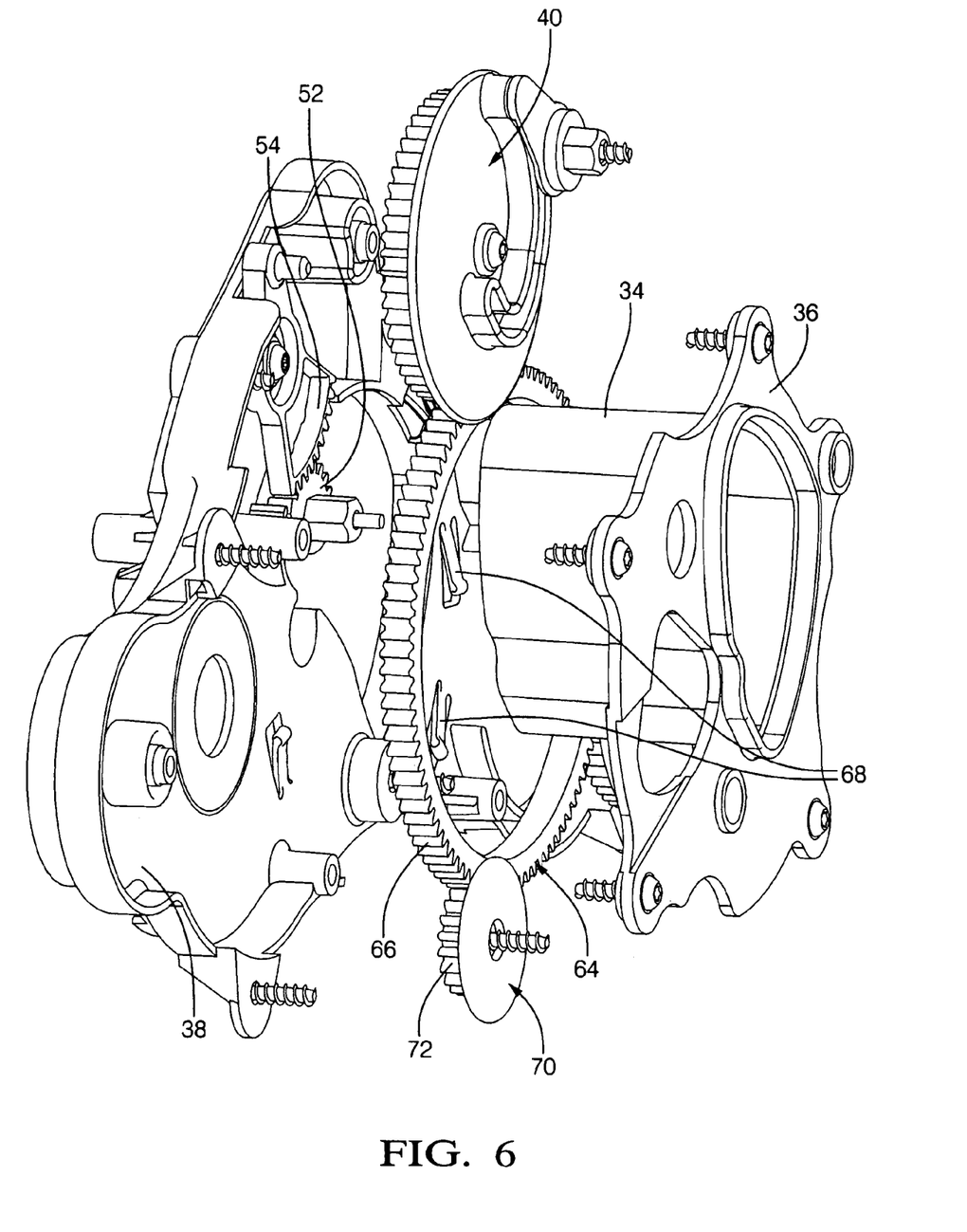
FIG. 6 is a fragmentary view of the subassembly showing the fingers disposed on the upper mounting bracket.

The gear system includes a transmission member supported on the upper mounting bracket 38 for connecting the drive gear 40 to the driven gears 46, 48, 50 for rotating the driven gears 46, 48, 50 in response to the drive gear 40. According to the exemplary embodiment, the transmission member is an annular idling gear 64 having a plurality of annular idling gear teeth 66 for meshing engagement with the drive gear teeth 42. The annular idling gear 64 is rotatably supported by the upper mounting bracket 38 and sandwiched between the upper mounting bracket 38 and the lower mounting bracket 36 and encircles the side port 34. As shown more clearly in FIG. 6, the upper mounting bracket 38 includes a plurality of fingers 68 for securing the annular idling gear 64 between the upper and lower mounting brackets 38, 36. Referring again to FIGS. 2-5, a positioning gear 70 is rotatably supported on the lower mounting bracket 36 and includes a plurality of positioning gear teeth 72 in meshing engagement with the annular idling gear 64 for securing the annular idling gear 64 laterally about the side port 34. The positioning gear 70 includes a positioning gear flange 74 extending outwardly in a radial fashion. The flange extends between the annular idling gear 64 and the lower mounting bracket 36 to space the annular idling gear 64 from the lower mounting bracket 36. Each of the vent driven gear 46 and defrost driven gear 48 also includes a plurality of meshing gear teeth, including vent driven gear teeth 76 and defrost driven gear teeth 78, respectively, for meshing engagement with the annular idling gear teeth 66. The vent driven gear 46 and defrost driven gear 48 also each include a vent driven gear flange 80 and a defrost driven gear flange 82 extending outwardly in a radial fashion to space the annular idling gear 64 from the lower mounting bracket 36. The rear mode driven gear 50 includes a plurality of rear mode driven gear 50 teeth for meshing engagement with the drive gear teeth 42.

According to a first aspect of the exemplary embodiment, the plurality of valves 26, 28, 30, 32 includes a slice valve 26 covering the outer periphery of the housing outlet 24 when in a closed position. As can be seen more easily in FIG. 4, the slice valve 26 includes a corresponding slice valve 26 for covering a corresponding housing outlet 24 on the opposite end of the housing 22. The slice valve 26 is rotatable about a slice valve axis B to an open position to fluidly connect the housing outlet 24 to the heater duct (not shown). The plurality of valve levers 52, 54, 56, 58, 60, 62 includes a first heater lever 52 engaging the slice valve 26, and a second heater lever 54 engaging the first heater lever 52. The plurality of valves 26, 28, 30, 32 also includes a vent flap valve 28 rotatable about the slice valve axis B for selectively directing airflow to at least one of a dashboard outlet (not shown) and a floorboard outlet (not shown). The plurality of valve levers 52, 54, 56, 58, 60, 62 includes a vent lever 56 engaging the vent flap valve 28. The vent driven gear 46 includes oppositely facing sides to define a vent side and a heater side. A vent cam track 84 is disposed along the vent side, engaging the vent lever 56 for operating the vent flap valve 28 in response to the vent driven gear 46. A heater cam track 86 is disposed along the heater side, engaging the second heater lever 54 for operating the slice valve 26 in response to the vent driven gear 46.

According to a second aspect of the exemplary embodiment, the plurality of valves 26, 28, 30, 32 includes a defrost flap valve 30 for selectively directing airflow to a defrost outlet (not shown), and the plurality of valve levers 52, 54, 56, 58, 60, 62 includes a defrost valve lever 58 engaging the defrost flap valve 30. The defrost driven gear 48 includes a defrost cam track 88 engaging the defrost lever for operating the defrost flap valve 30 in response to the defrost driven gear 48.

According to a third aspect of the exemplary embodiment, the plurality of valves 26, 28, 30, 32 includes a rear mode flap valve 32 for selectively directing airflow to a rear outlet (not shown), and the plurality of valve levers 52, 54, 56, 58, 60, 62 includes a first rear mode lever 60 engaging the rear mode flap valve 32 and a second rear mode lever 62 engaging the first rear mode lever 60. The rear mode driven gear 50 includes a rear mode cam track 90 engaging the second rear mode lever 62 for operating the rear mode flap valve 32 in response to the rear mode driven gear 50.

According to the exemplary embodiment, each of the cam tracks 84, 86, 88, 90 follows a non-linear path so that rotation of the actuator 44 to the same radial position will not always position the valves 26, 28, 30, 32 in the same manner. The actuator 44 then provides torque to rotate the drive gear 40, which is, in turn, threadingly engaged with the annular idling gear 64. The annular idling gear 64 is threadingly engaged with both the defrost driven gear 48 and the vent driven gear 46. The drive gear 40 is also threadingly engaged with the rear mode driven gear 50. Based on a selected mode of operation, the actuator 44 rotates to a specified position that causes each of the driven gears 46, 48, 50 to rotate in response. The levers 52, 54, 56, 58, 60, 62 translate along the cam tracks 84, 86, 88, 90 inducing a rotation in the respective valves 26, 28, 30, 32 about a fixed point, thereby causing air to be ducted through the HVAC system in accordance with the selected mode of operation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly for controlling airflow in an HVAC system in different modes of operation comprising;
    a housing defining a housing outlet,
    at least one valve extending within said housing for directing airflow through at least one of a plurality of ducts,
    a side port extending outwardly from said housing in fluid communication with said housing outlet,
    a drive gear rotatably supported on said housing for rotation about a drive axis,
    at least one driven gear rotatably supported on said housing and engaging said valve for actuating said valve,
    a transmission member for connecting said drive gear to said driven gear for rotating said driven gear in response to said drive gear,
    said transmission member including an annular idling gear rotatably supported on said housing for rotation about an annular gear axis and encircling said side port and engaging said drive gear and engaging said driven gear.

2. An assembly as set forth in claim 1 wherein said housing includes an upper mounting bracket having an opening therein for receiving said side port and rotatably supporting and securing said annular gear axially.

3. An assembly as set forth in claim 2 wherein said driven gear includes a driven gear flange extending radially outwardly therefrom and extending beneath said annular idling gear for spacing said annular idling gear axially from said housing.

4. An assembly as set forth in claim 3 wherein said upper mounting bracket includes at least one finger for securing said annular idling gear axially against said driven gear flange.

5. An assembly as set forth in claim 2 including a positioning gear engaging said annular idling gear for securing said annular idling gear laterally about said side port.

6. An assembly as set forth in claim 5 wherein said positioning gear includes a positioning gear flange extending radially outwardly therefrom and extending beneath said annular idling gear for spacing said annular idling gear axially from said housing.

7. An assembly as set forth in claim 2 wherein said housing includes a lower mounting bracket extending between said annular idling gear and said housing and spaced axially from said annular idling gear by said driven gear flange.

8. An assembly as set forth in claim 7 wherein said lower mounting bracket extends laterally outwardly from said side port.

9. An assembly as set forth in claim 2 including a plurality of valves extending within said housing and rotatably supported therein for directing airflow through at least one of a plurality of ducts in response to a selected mode of operation.

10. An assembly as set forth in claim 9 including a plurality of said driven gears each rotatably supported on said upper mounting bracket.

11. An assembly as set forth in claim 10 including a plurality of valve levers each connecting one of said valves to one of said driven gears for actuating said valves in response to rotation of said driven gears.

12. An assembly as set forth in claim 11 wherein said plurality of driven gears each include at least one cam track engaging at least one of said plurality of valve levers for operating at least one of said valves in response to said driven gear.

13. An assembly as set forth in claim 12 wherein said plurality of valves includes a slice valve covering said housing outlet in a closed position and rotatable about a slice valve axis to an open position and said plurality of valve levers including a first heater lever engaging said slice valve and said plurality of valve levers including a second heater lever engaging said first heater lever.

14. An assembly as set forth in claim 13 wherein said plurality of valves includes a vent flap valve rotatable about said slice valve axis for selectively directing airflow to at least one of a dashboard outlet and a floorboard outlet and said plurality of valve levers includes a vent lever engaging said vent flap valve and said plurality of driven gears includes a vent driven gear having oppositely facing sides to define a vent side and a heater side and rotatable about a vent gear axis engaging said annular idling gear for rotation in response to said drive gear.

15. An assembly as set forth in claim 14 wherein said vent driven gear includes a vent driven gear flange extending radially outwardly therefrom and extending beneath said annular idling gear for spacing said annular idling gear axially from said housing.

16. An assembly as set forth in claim 14 wherein said vent driven gear includes a vent cam track along said vent side engaging said vent lever for operating said vent flap valve in response to said vent driven gear.

17. An assembly as set forth in claim 14 wherein said vent driven gear includes a heater cam track along said heater side engaging said second heater lever for operating said slice valve in response to said vent driven gear.

18. An assembly as set forth in claim 12 wherein said plurality of valves includes a defrost flap valve for selectively directing airflow to a defrost outlet and said plurality of valve levers includes a defrost valve lever engaging said defrost flap valve and said plurality of driven gears includes a defrost driven gear rotatable about a defrost gear axis engaging said annular idling gear for rotation in response to said drive gear and said defrost driven gear includes a defrost cam track engaging said defrost lever for operating said defrost flap valve in response to said defrost driven gear.

19. An assembly as set forth in claim 18 wherein said defrost driven gear includes a defrost driven gear flange extending radially outwardly therefrom and extending beneath said annular idling gear for spacing said annular idling gear axially from said housing.

20. An assembly as set forth in claim 12 wherein said plurality of valves includes a rear mode flap valve for selectively directing airflow to a rear outlet and said plurality of valve levers includes a first rear mode lever engaging said rear mode flap valve and a second rear mode lever engaging said first rear mode lever and said plurality of driven gears includes a rear mode driven gear rotatable about a rear mode axis and engaged directly with said drive gear and said rear mode driven gear includes a rear mode cam track engaging said second rear mode lever for operating said rear mode flap valve in response to said rear mode driven gear.

21. An assembly as set forth in claim 10 wherein said drive gear and said driven gears each include a plurality of meshing gear teeth for respective meshing engagement with each other.

22. An assembly as set forth in claim 2 including an actuator secured to said upper mounting bracket for rotating said drive gear about said drive axis.

23. An assembly for controlling airflow in an HVAC system in different modes of operation comprising;
a housing defining a housing outlet having an outer periphery,
a plurality of valves extending within said housing and rotatably supported therein for directing airflow through at least one of a plurality of ducts in response to a selected mode of operation,
a side port extending outwardly from said housing in fluid communication with said housing outlet,
said housing including a lower mounting bracket extending laterally outwardly from said side port,
said housing including an upper mounting bracket having an opening therein for receiving said side port,
a drive gear including a plurality of drive gear teeth and rotatably supported on said upper mounting bracket for rotation about a drive axis,
an actuator secured to said upper mounting bracket for rotating said drive gear about said drive axis,
a plurality of driven gears each rotatably supported on said upper mounting bracket,
a plurality of valve levers each connecting one of said valves to one of said driven gears for actuating said valves in response to rotation of said driven gears,
a transmission member supported on said upper mounting bracket for connecting said drive gear to at least one of said driven gears for rotating at least one of said driven gears in response to said drive gear,
said plurality of valves including a slice valve covering said outer periphery of said housing outlet in a closed position and rotatable about a slice valve axis to an open position,
said plurality of valve levers including a first heater lever engaging said slice valve,
said plurality of valve levers including a second heater lever engaging said first heater lever,
said plurality of valves including a vent flap valve rotatable about said slice valve axis for selectively directing airflow to at least one of a dashboard outlet and a floorboard outlet,
said plurality of valve levers including a vent lever engaging said vent flap valve,
said plurality of driven gears including a vent driven gear rotatable about a vent gear axis and including a plurality of vent gear teeth engaging said transmission member for rotation in response to said drive gear,
said vent driven gear including oppositely facing sides to define a vent side and a heater side,
said vent driven gear including a vent cam track along said vent side engaging said vent lever for operating said vent flap valve in response to said vent driven gear,
said vent driven gear including a heater cam track along said heater side engaging said second heater lever for operating said slice valve in response to said vent driven gear,
said plurality of valves including a defrost flap valve for selectively directing airflow to a defrost outlet,
said plurality of valve levers including a defrost valve lever engaging said defrost flap valve, said plurality of driven gears including a defrost driven gear rotatable about a defrost gear axis and including a plurality of defrost gear teeth engaging said transmission member for rotation in response to said drive gear, said defrost driven gear including a defrost cam track engaging said defrost lever for operating said defrost flap valve in response to said defrost driven gear, said plurality of valves including a rear mode flap valve for selectively directing airflow to a rear outlet, said plurality of valve levers including a first rear mode lever engaging said rear mode flap valve, said plurality of valve levers including a second rear mode lever engaging said first rear mode lever, said plurality of driven gears including a rear mode driven gear rotatable about a rear mode axis and including a plurality of rear mode gear teeth engaging said drive gear teeth, said rear mode driven gear including a rear mode cam track engaging said second rear mode lever for operating said rear mode flap valve in response to said rear mode driven gear, said transmission member including an annular idling gear having annular idling gear teeth engaging said drive gear teeth and rotatable about an annular gear axis, said annular idling gear rotatably supported by said upper mounting bracket and sandwiched between said upper mounting bracket and said lower mounting bracket, said annular idling gear teeth engaging said vent driven gear teeth and said defrost driven gear teeth, said annular idling gear encircling said side port, a positioning gear including a plurality of positioning gear teeth directly engaging said annular idling gear for securing said annular idling gear laterally about the side port, said positioning gear including a positioning gear flange extending radially outwardly therefrom and extending between said annular idling gear and said lower mounting bracket, said defrost driven gear including a defrost driven gear flange extending radially outwardly therefrom and extending between said annular idling gear and said lower mounting bracket, said vent driven gear including a vent driven gear flange extending radially outwardly therefrom and extending between said annular idling gear and said lower mounting bracket, and said upper mounting bracket including a plurality of fingers for securing said annular idling gear between said upper and lower mounting brackets.

\* \* \* \* \*